(12) United States Patent
Rogers et al.

(10) Patent No.: US 7,650,458 B2
(45) Date of Patent: Jan. 19, 2010

(54) FLASH MEMORY DRIVER

(75) Inventors: Andrew Rogers, Redmond, WA (US);
Sachin C. Patel, Redmond, WA (US);
Yadhu N. Gopalan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 11/474,234

(22) Filed: Jun. 23, 2006

(65) Prior Publication Data
US 2007/0300009 A1    Dec. 27, 2007

(51) Int. Cl.
*G06F 12/16*    (2006.01)

(52) U.S. Cl. .......................... 711/103; 711/155; 714/6; 714/19

(58) Field of Classification Search .................... None
See application file for complete search history.

(56) References Cited

U.S. PATENT DOCUMENTS

| | | | |
|---|---|---|---|
| 5,933,368 A | 8/1999 | Ma et al. | |
| 5,999,446 A | 12/1999 | Harari et al. | |
| 6,279,069 B1 * | 8/2001 | Robinson et al. | 711/103 |
| 6,377,500 B1 | 4/2002 | Fujimoto et al. | |
| 6,901,499 B2 | 5/2005 | Aasheim et al. | |
| 6,957,295 B1 | 10/2005 | Estakhri | |
| 6,978,342 B1 | 12/2005 | Estakhri et al. | |
| 7,516,267 B2 * | 4/2009 | Coulson et al. | 711/103 |
| 2003/0163632 A1 | 8/2003 | Aasheim et al. | |
| 2004/0210706 A1 * | 10/2004 | In et al. | 711/103 |
| 2004/0230573 A1 | 11/2004 | Rhoads et al. | |
| 2004/0250172 A1 | 12/2004 | Patel et al. | |
| 2005/0157553 A1 | 7/2005 | Perroni et al. | |
| 2005/0216653 A1 | 9/2005 | Aasheim et al. | |
| 2005/0223186 A1 * | 10/2005 | Belevich et al. | 711/202 |
| 2005/0256997 A1 * | 11/2005 | Koren et al. | 711/103 |
| 2007/0143530 A1 * | 6/2007 | Rudelic et al. | 711/103 |
| 2008/0177939 A1 * | 7/2008 | Patel et al. | 711/103 |
| 2009/0031076 A1 * | 1/2009 | In et al. | 711/103 |

FOREIGN PATENT DOCUMENTS

WO    WO0131458 A1    5/2001

OTHER PUBLICATIONS

Blunk Microsystems, "TargetFFS: Embedded Flash File Systems", http://www.blunkmicro.com/ffs.htm, last viewed on Aug. 25, 2008, 1 page.

Kawaguchi et al, "A Flash-Memory Based File System", In Proceedings of the Winter 1995 USENIX Technical Conference, Jan. 16-20, 1995, pp. 1-10, New Orleans, Louisiana.

Woodhouse David, "JJFS: The Journalling Flash File System", In proceedings of Ottawa Linux Symposium 2001, pp. 1-12, Jul. 2001, Ottawa, Canada.

* cited by examiner

*Primary Examiner*—Than Nguyen

(57) ABSTRACT

Various flash management techniques may be described. An apparatus may comprise a processor, a flash memory coupled to the processor, and a flash management module. The flash management module may be executed by the processor to receive a write transaction request to write data to a flash memory, and write the data to a set of multiple discontiguous logical sectors corresponding to a set of physical sectors of the flash memory in a single atomic operation. Other embodiments are described and claimed.

20 Claims, 4 Drawing Sheets

FLASH MEMORY DRIVER

CROSS REFERENCE TO RELATED APPLICATION

This application is related to U.S. patent application Ser. No. 11/473,754 titled "Flash Management Techniques," and filed on Jun. 23, 2006, the entirety of which is hereby incorporated by reference.

BACKGROUND

Flash media is a becoming an increasingly popular and inexpensive medium commonly used for persistent data storage in embedded devices. Unlike common magnetic read/write disks, which allow sectors to be randomly read from and written to, flash media requires that blocks be erased before being re-written. The erase resolution (e.g., one block) is typically much larger than the read/write resolution (e.g., one sector or page). Care must also be taken when writing to flash media in order to distribute writes evenly across the flash part, a technique referred to sometimes as "wear-leveling." Each flash block has a limited number of erase operations before it wears out. In addition, some flash parts even have strict requirements on the order that sectors can be written in a block. Consequently, the interface for reading and writing flash is considerably different that the interface for reading and writing a magnetic disk. Accordingly, there may be a need for improved techniques for flash management to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments generally relate to memory management techniques for various types of computing memory. Some embodiments relate to memory management techniques for flash memory in particular. One embodiment, for example, comprises a novel flash management module implementing a flash driver architecture that will support, among other memory management techniques, atomic sector write operations and wear-leveling operations. For example, the flash management module may write a batch of multiple discontiguous sectors to flash memory in a single atomic operation. This may be accomplished by leveraging various properties of a disk emulation layer in a typical flash driver implementation, such as logical-to-physical mappings, batch write commitments, and metadata stored in a spare area of the flash memory. Examples of useful metadata may include transaction bits, logical sector mapping, and/or transaction sequence numbers.

In one embodiment, for example, an apparatus may include a processor, a flash memory coupled to the processor, and a flash management module. The flash management module may be executed by the processor to receive a write request to write data to the flash memory. The flash management module may write the data to a set of multiple discontiguous logical sectors corresponding to a set of physical sectors of the flash memory in a single atomic operation. The flash management module may be implemented as, for example, part of a flash memory architecture including a file system, a flash abstraction layer, a flash media driver, and the flash memory. Other embodiments are described and claimed.

DETAILED DESCRIPTION

Various embodiments may be generally directed to a new atomic write application program interface (API) that leverages the performance advantages of a monolithic file system while maintaining the flexibility of an emulated disk driver or flash abstraction layer. The atomic write API may be exposed by a flash driver and leveraged by a given file system. The atomic write API allows the file system to batch multiple discontiguous sector write operations into a single transaction to be serviced by the flash driver as a single atomic operation. This effectively allows the file system to reduce or eliminate its own logging/transacting overhead, and shifting the burden instead to the flash driver which typically already implements its own transacting mechanism.

Figure 1:
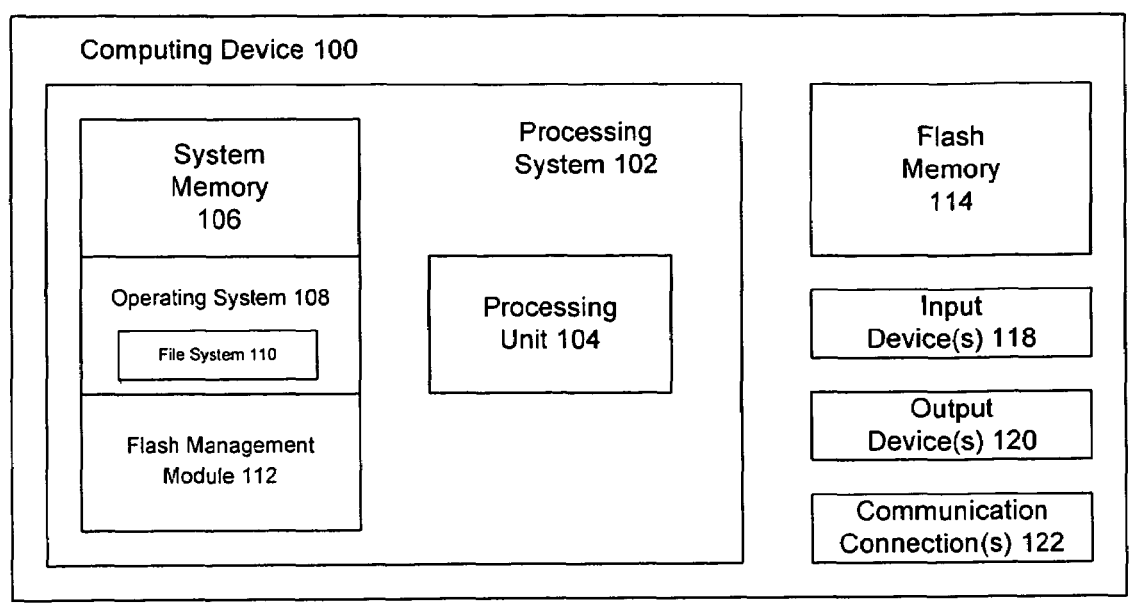
FIG. 1 illustrates an exemplary embodiment of a computing device.

FIG. 1 illustrates a block diagram for a computing device 100. Computing device 100 may represent a general system architecture suitable for implementing various embodiments. Computing device 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, software objects, or any combination thereof. Although computing device 100 as shown in FIG. 1 has a limited number of elements in a certain topology, it may be appreciated that computing device 100 may include more or less elements in alternate topologies as desired for a given implementation. The embodiments are not limited in this context.

In various embodiments, computing device 100 may be implemented as part of a target device. Examples of target devices may include, but are not limited to, a computer, a computer system, a computer sub-system, a workstation, a terminal, a server, a web server, a virtual server, a personal computer (PC), a desktop computer, a laptop computer, an ultra-laptop computer, a portable computer, a handheld computer, a personal digital assistant (PDA), a mobile computing device, a cellular telephone, a media device (e.g., audio device, video device, text device, and so forth), embedded device, and any other electronic, electromechanical, or electrical device. The embodiments are not limited in this context.

In various embodiments, computing device 100 typically includes a processing system of some form. In its most basic configuration, computing device 100 may include a processing system 102 having at least one processing unit 104 and system memory 106. Processing unit 104 may be any type of processor capable of executing software, such as a general-purpose processor, a dedicated processor, a media processor, a controller, a microcontroller, an embedded processor, a digital signal processor (DSP), and so forth. System memory 106 may be implemented using any machine-readable or computer-readable media capable of storing data, including both volatile and non-volatile memory. For example, system memory 106 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

As shown in FIG. 1, system memory 106 may store various software programs, such as one or more operating systems 108 and accompanying data. An operating system (OS) is a software program that manages the hardware and software resources of a computer. The OS performs basic tasks, such as controlling and allocating memory, prioritizing the processing of instructions, controlling input and output devices, facilitating networking, managing files, and so forth. Examples of OS 108 may include MICROSOFT® WINDOWS®, as well as others.

OS 108 may further comprise a file system 110. File system 110 may store and organize computer files to facilitate the location, access and use of the files. File system 110 may store and maintain the files with some form of computer-readable media or machine-readable media, as previously described. More formally, file system 110 may represent a set of abstract data types that are implemented for the storage, hierarchical organization, manipulation, navigation, access, and retrieval of data. OS 108 and file system 110 may be integrated, or alternatively, may be implemented as separate software programs.

Computing device 100 may also have additional features and/or functionality beyond processing system 102. For example, computing device 100 may have one or more flash memory units 114. In another example, computing device 100 may also have one or more input devices 118 such as a keyboard, mouse, pen, voice input device, touch input device, and so forth. In yet another example, computing device 100 may further have one or more output devices 120, such as a display (e.g., display 110), speakers, printer, and so forth. In still another example, computing device 100 may also include one or more communications connections 122. It may be appreciated that other features and/or functionality may be included in computing device 100 as desired for a given implementation.

In various embodiments, computing device 100 may further include one or more communications connections 122 that allow computing device 100 to communicate with other devices. Communications connections 122 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include storage media.

In various embodiments, computing device 100 may further include one or more flash memory units 114. Flash memory unit 114 may comprise any form of non-volatile memory that can be electrically erased and reprogrammed by region or blocks. Flash memory unit 114 may be implemented as either removable or non-removable memory. Examples of flash memory unit 114 may include NAND flash memory, NOR flash memory, single-level cell (SLC) flash memory, multi-level cell (MLC) flash memory, large block NAND flash memory, and others. The embodiments are not limited in this context.

In one embodiment, for example, flash memory unit 114 may be implemented using NAND flash memory. NAND flash memory comprises media divided into a collection of blocks which are then further subdivided into pages, anywhere from the traditional 512 bytes in size to 2 kilobytes (KB) in size for certain large-block NAND, for example. NAND flash memory is typically split into a series of contiguous blocks (e.g., I-N). Each block is then further subdivided into some number of pages (e.g., 32 pages per block is a common value for a 16 MB NAND flash device). Each page is then further divided into two distinct sections. The first section is a data area used to store information. The data area may be anywhere from 512 bytes on small block NAND and 2 KB on large block NAND, for example. The second section is a spare area used to store supplemental or extraneous information. The spare area may be anywhere from 16 bytes on small block NAND and 64 bytes on large block NAND, for example. Examples of extraneous information may include flash abstraction layer (FAL) metadata, error-correaction codes (ECC) to safeguard against data corruption due to leakage currents, and so forth.

NAND flash memory typically includes several design constraints. For example, NAND flash memory typically requires pages to be programmed sequentially within a block. Once a page has been written and subsequent pages have been written, that original page cannot be re-written before the entire block is erased. In another example, flash memory write operations can only set a bit from a logical one (1) to a logical zero (0), and erasing a block sets all of the bits in the block to a logical one (1). In yet another example, only blocks can be erased and therefore it is not possible to erase individual pages/bytes in a block without erasing all pages/bytes within the same block. In still another example, blocks have a limited erase lifetime (e.g., 100,000 to 1,000,000 cycles). In yet another example, read operations do not count against the write/erase lifetime. As a result of these characteristics, it is necessary to perform wear-leveling operations on the flash memory to maximize the lifetime of the device.

Additionally, a technique for effectively writing data from a write transaction using a single atomic operation may be desirable as well. The term "atomic" and its variants may generally refer to completing an entire operation or none at all. For example, an atomic sector write may refer to completing an entire write transaction or none of the write transaction. In other words, a partial write transaction typically is not performed. This may reduce or eliminate any logging/transacting overhead typically incurred by file system 110.

In order to manage the different types of flash memory 114 and corresponding design constraints that may be implemented for computing device 100, computing device 100 may include a flash management module (FMM) 112. FMM 112 may be used to implement a robust flash driver architecture designed to manage flash memory, such as flash memory 114. FMM 112 may be arranged to manage flash memory 114 when implemented using any type of flash memory, including various types of NAND flash memory and/or NOR flash memory. Furthermore, FMM 112 may be arranged to manage flash memory 114 when implemented using various improved forms of NAND flash memory as well, such as MLC flash memory, large block NAND flash memory, and so forth.

FMM 112 provides several advantages over conventional flash architectures. In a monolithic flash file system, for example, a file system driver manages all flash operations on its own. These types of file systems are not generic and are typically tied to a particular flash technology. They cannot be easily applied to other forms of media, such as a disk. Monolithic flash file systems can, however, leverage the properties of flash to offer better file system performance than a disk-based file system. The flash access requirements also align well with the access pattern of a log-based file system, which is typically used to maintain data integrity. Another approach utilizes a disk-based file system and an emulated disk driver. In these configurations, any file system normally designed to be run on magnetic disk media can be re-targeted at flash media with little to no required changes. Instead of modifying the file system, it is the responsibility of an emulation layer in the flash driver to provide the random access read/write interface typically exposed by a disk while adhering to the underlying flash access requirements. In order to maintain data integrity, a file system typically employs some type of logging or transactions. In this configuration, the properties of flash are not exposed to the file system and cannot be used advantageously for this purpose, which typically leads to performance penalty over monolithic flash file systems.

FMM 112 may utilize a new atomic write API that leverages the performance advantages of a monolithic file system while maintaining the flexibility of an emulated disk driver. The atomic write API may be exposed by the flash driver and leveraged by file system 110. The atomic write API allows file system 110 to batch multiple discontiguous sector write operations into a single transaction to be serviced by the flash driver as a single atomic operation. This effectively allows file system 110 to reduce or eliminate its own logging/transacting overhead, shifting the burden instead to the flash driver which typically already implements its own transacting mechanism. Computing device 100 in general, and FMM 112 in particular, may be described in more detail with reference to FIG. 2.

Figure 2:
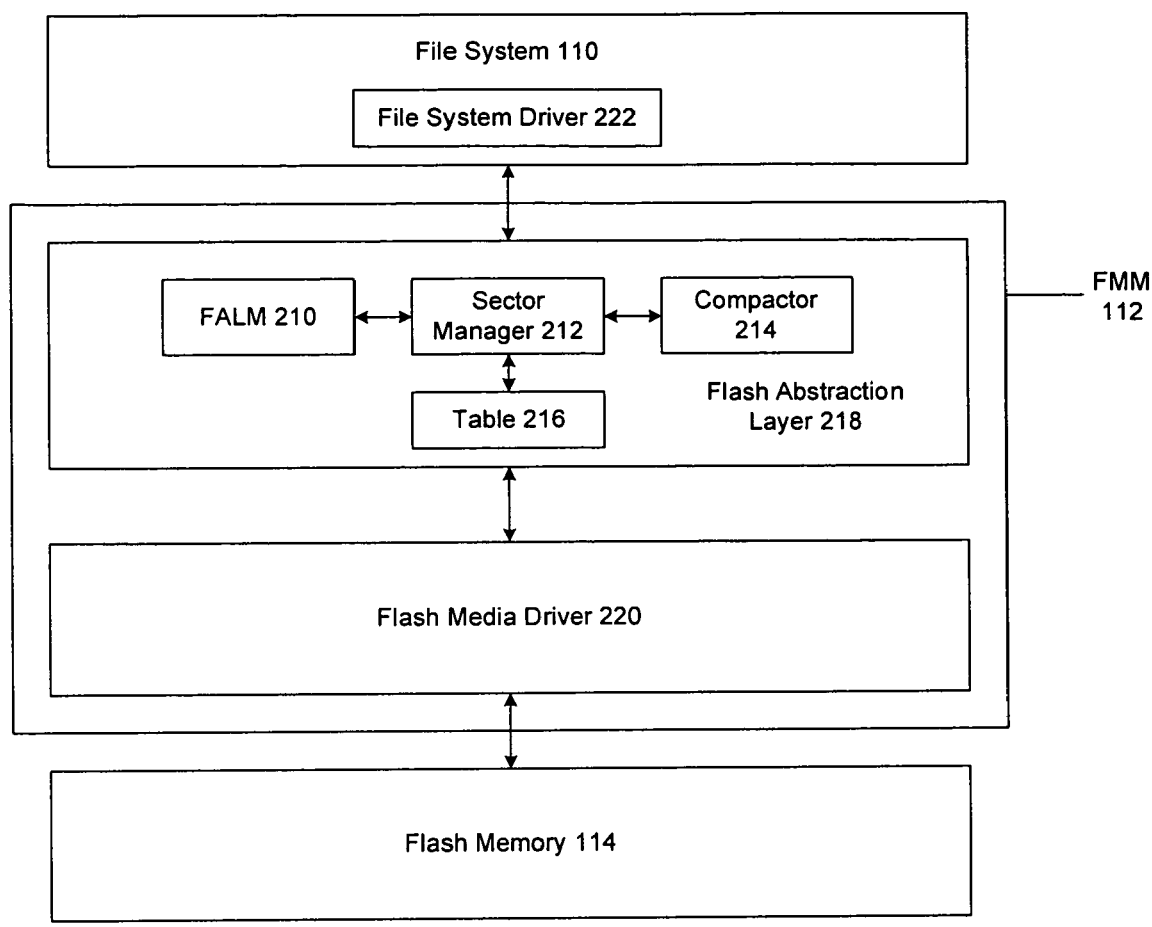
FIG. 2 illustrates an exemplary embodiment of a flash management module.

FIG. 2 illustrates an exemplary embodiment of FMM 112. FIG. 2 illustrates a high-level architecture for FMM 112. As shown in FIG. 2, file system 110 is positioned above a translation layer referred to as FAL 218. FAL 218 is responsible for handling all input/output (I/O) requests from the upper-level file system 110, implementing all of the necessary wear-leveling operations, maintaining data integrity, handling power-failure situations, and so forth. FAL 218 typically passes the actual read and write requests onto a flash media driver (FMD) 220. FMD 220 may be implemented as a set of entry points that are responsible for interacting with the actual flash hardware, such as flash memory 114, for example. FMD 220 is responsible for implementing the program/erase algorithms necessary to perform read operations, write operations, and erase operations using flash memory 114.

The high-level architecture shown in FIG. 2 provides implementation flexibility. For example, through the use of FAL 218, different types of file system 110 may be implemented for a given target device. Additionally, through the use of FMD 220, different types of flash memory 114 may be implemented for a particular target device. Furthermore, different types of ECC codecs (if any) may be selected to use for a respective memory device since the ECC codec has been relegated to FMD layer in the abstraction chain.

In various embodiments, FAL 218 may be separated into several functional components or modules. In one embodiment, for example, FAL 218 may include a main flash abstraction layer module (FALM) 210, a sector manager 212, a compactor module 214, and a mapping table 216. FALM 210 is a software object responsible for handling the read/write to a particular flash region of flash memory 114, as well as building up the logical-to-physical mapping during initialization. A software object may represent any discrete unit of software arranged to perform a specific function. Sector manager 212 is responsible for managing the list of free and dirty sectors on the media. When prompted, sector manager 212 will return the next free sector on the media if available. Mapping table 216 is responsible for maintaining the logical-to-physical sector mapping. File system 10 uses logical sectors that are then mapped to arbitrary physical sectors on the media. As a result, FAL 218 must translate all logical sector addresses from file system 110 into the corresponding physical sector addresses on the media. Compactor module 214 is responsible for recycling dirty sectors into free sectors. Compactor module 214 analyzes an entire flash block to determine which sectors are dirty and can be recycled. Any sectors in a block that are not dirty are re-mapped to another portion of the media.

FALM 210 operates as the main control point of FAL 218. It manages a particular flash region and, among other operations, implements the concept of sequence numbers to mark a particular transaction. For example, sequence numbers may be used to track a write transaction. The write transaction will begin with a control sector, which contains the sequence number as well as the list of physical sectors that will be written. Followed by the write control sector, the sectors that were passed in will be written sequentially. Once the transaction is completed, any logical sectors with the same logical sector address and an older sequence number will be interpreted as dirty.

Among other operations, FALM 210 maintains a mapping between logical and physical sectors. Logical sector data can exist anywhere physically on flash memory 114 and is not required to be physically contiguous. This property supports discontiguous sector writes in a single transaction. Though the sectors are logically discontiguous, it may be appreciated that the logical sectors can be written to a single contiguous physical region, as desired for a given implementation.

FALM 210 may also be arranged to write logical sector data to a new physical location. As a result, existing data will not be modified or erased until a set of data for a write transaction is entirely committed. This property supports atomic operations. In other words, the previous data for a batch of sectors will not be modified until the entire batch is committed.

FALM 210 may further be arranged to store various types of metadata in a programmable spare area of flash memory 114. These spare bytes may be used to track additional metadata used by the flash driver, such as transaction bits, logical sector mapping, transaction sequence numbers, and so forth. In one embodiment, for example, FALM 210 may store metadata in the form of sequence numbers in the programmable spare area of flash memory 114. Using this technique, FALM 210 may be arranged to assign a unique number to each write transaction, writes data to each sector including a sequence number in the spare area, and then commits the transaction by updating the last known good (LKG) sector number. Although sequence numbers are used by way of example only, it may be appreciated that various other types of metadata may be used to mark a write transaction and still fall within the intended scope of the embodiments. The embodiments are not limited in this context.

In various embodiments, file system 110 may include a file system driver 222. File system driver 222 may be arranged to interact with FMM 112 via one or more interfaces, such as an API layer including an API software library of software objects. The software objects may be interoperable with corresponding defined API commands to call or support the above-referenced operations of FAL 218 and/or FALM 210. The API layer may allow various custom applications to utilize the media management techniques implemented using FAL 218 and/or FALM 210. The API layer may be used in conjunction with FAL 218, or separate from FAL 218, as desired for a given implementation.

In general, an API is a computer process or technique that allows other processes to work together. In the familiar setting of a personal computer running an operating system and various applications such as MICROSOFT WORD®, an API allows the application to communicate with the operating system. An application makes calls to the operating system API to invoke operating system services. The actual code behind the operating system API is located in a collection of dynamic link libraries (DLLs).

Similar to other software elements, an API can be implemented in the form of computer executable instructions whose services are invoked by another software element. The computer executable instructions can be embodied in many different forms. Eventually, instructions are reduced to machine-readable bits for processing by a computer processor. Prior to the generation of these machine-readable bits, however, there may be many layers of functionality that convert an API implementation into various forms. For example, an API that is implemented in C++ will first appear as a series of human-readable lines of code. The API will then be compiled by compiler software into machine-readable code for execution on a processor, such as processing unit 202, for example.

The proliferation of different programming languages and execution environments have brought about the need for additional layers of functionality between the original implementation of programming code, such as an API implementation, and the reduction to bits for processing on a device. For example, a computer program initially created in a high-level language such as C++ may be first converted into an intermediate language such as MICROSOFT® Intermediate Language (MSIL). The intermediate language may then be compiled by a Just-in-Time (JIT) compiler immediately prior to execution in a particular environment. This allows code to be run in a wide variety of processing environments without the need to distribute multiple compiled versions. In light of the many levels at which an API can be implemented, and the continuously evolving techniques for creating, managing, and processing code, the embodiments are not limited to any particular programming language or execution environment.

In various embodiments, a new atomic write API in the form or an I/O control code (IOCTL) along with corresponding data structures may be used by file system driver 222 to perform atomic sector write operations via FMM 1112. In one embodiment, for example, an IOCTL referred to as IOCTL_DISK_MULTI_WRITE_SECTORS may be defined to write a set of sector range/sector data pairs to flash memory 114 in a single transfer. In this embodiment, sector ranges do not necessarily need to be contiguous. An example of the new IOCTL_DISK_MULTI_WRITE_SECTORS may be defined as follows:

```
IOCTL_DISK_MULTI_WRITE_SECTORS
lpInBuffer
[in] Pointer to a MULTI_SECTOR_TRANSFER structure.
nInBufferSize
[in] Set to sizeof(MULTI_SECTOR_TRANSFER) plus an additional
sizeof(SECTOR_TRANSFER_BUFFER) for each SECTOR_TRANSFER_BUFFER in BufferList
beyond 1.
lpOutBuffer
[out] Unused; set to NULL.
nOutBufferSize
[in] Unused; set to 0.
lpBytesReturned
[out] Unused; set to NULL.
#define IOCTL_DISK_MULTI_WRITE_SECTORS \
CTL_CODE(IOCTL_DISK_BASE, 0x602, METHOD_BUFFERED, FILE_WRITE_ACCESS)
SECTOR_TRANSFER_BUFFER
// Sub-structure of MULTI_SECTOR_TRANSFER. Describes a sector range to transfer,
// and contains I/O buffers for the transfer.
typedef struct _SECTOR_TRANSFER_BUFFER
{
// Sector range to transfer.
ULONGLONG StartSector;
DWORD SectorCount;
// Virtual address of the I/O buffer for the transfer. Must be DWORD aligned, and must be
// at least (SectorCount * sector size).
```

```
-continued

BYTE* pBuffer;
// Array of physical frame numbers representing the CPU-dependent physical addresses of
// the pages in the I/O buffer. Same as the value returned by LockPages. This field is
// optional.
DWORD * pPFNs;
} SECTOR_TRANSFER_BUFFER;
MULTI_SECTOR_TRANSFER
// Input structure for IOCTL_DISK_MULTI_WRITE_SECTORS and
// IOCTL_DISK_MULTI_READ_SECTORS. Describes a set of discontiguous sector
// data/sector range pairs to be read from or written to disk in a single
// operation.
typedef struct _MULTI_SECTOR_TRANSFER
{
// Flags describing attributes for the transfer operation.
DWORD RequestFlags;
// Number of SECTOR_TRANSFER_BUFFER items in BufferList.
DWORD BufferCount;
// List of SECTOR_TRANSFER_BUFFER range/data structures. There must be BufferCount items
// in the list.
SECTOR_TRANSFER_BUFFER BufferList[1];
} MULTI_SECTOR_TRANSFER;
```

File system driver 222 may be modified to use the atomic write API as illustrated above. In one embodiment, for example, file system 110 may be implemented as a File Allocation Table (FAT) file system. Although some embodiments may describe file system 110 as a FAT file system, it may be appreciated that other file systems can be similarly modified to take advantage of this technique by grouping file data, directory data, and metadata changes into single or batch transaction requests.

File system 110 typically utilizes various types of write request operations to write data to the media, such as flash memory 114. An example of a write request operation may include a file-append operation. The file-append operation may provide an example of how a FAT file system driver might be modified to use the atomic write technique. Although the file-append operations is logically a single operation, a typical FAT file system makes multiple changes to the disk in order to complete the write transaction. File system 110 may perform the file-append operations, however, as a single atomic transaction via the atomic write API called by file system driver 222. The file-append operation may be further described with reference to FIG. 3.

Figure 3:
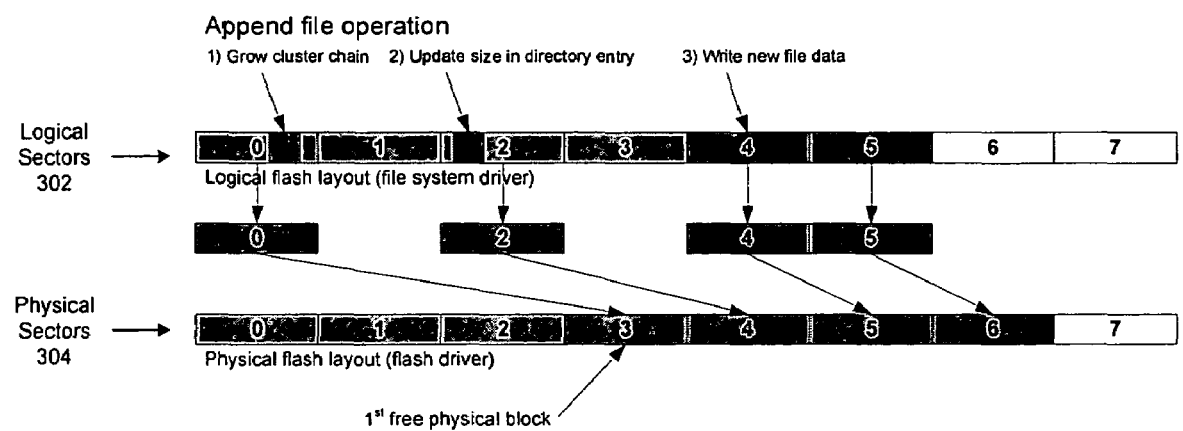
FIG. 3 illustrates an exemplary embodiment of logical-to-physical sector mapping.

FIG. 3 illustrates an exemplary embodiment of logical-to-physical sector mapping for a file-append operation. FIG. 3 illustrates a set of logical sectors 302 and a set of physical sectors 304. In response to a file-append request, the cluster chain in the File Allocation Table (FAT) is grown to accommodate the new data as indicated by logical sector 0 of logical sectors 302. The directory entry referring to the file being appended needs to be updated with the new file size as indicated by logical sector 2 of logical sectors 302. The actual data being appended is then written to disk as indicated by logical sectors 4 and 5. For FMM 112 and flash memory 114, logical sectors are written to new physical sectors for each write operation. This is because physical sectors need to be erased in blocks having a block size resolution that is greater than a single sector. Consequently, the logical sectors 0, 2, 4 and 5 may be written to a block of physical sectors 304, such as physical sectors 3, 4, 5 and 6, respectively, for example. The physical sectors 3, 4, 5 and 6 may be contiguous or non-contiguous as desired for a given implementation.

Each of these 3 operations typically consists of a single request to the disk/flash driver to write or re-write a sector. Using an atomic sector write, however, the FAT file system 110 may build a single request and pass it to the FAL 218 as an atomic transaction. This allows for all of the sectors to be written atomically, where either all of the sectors are committed or none of them are. Although the file-append operation is used as one example, the atomic write techniques may be applied to other file write operations as desired for a given implementation. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
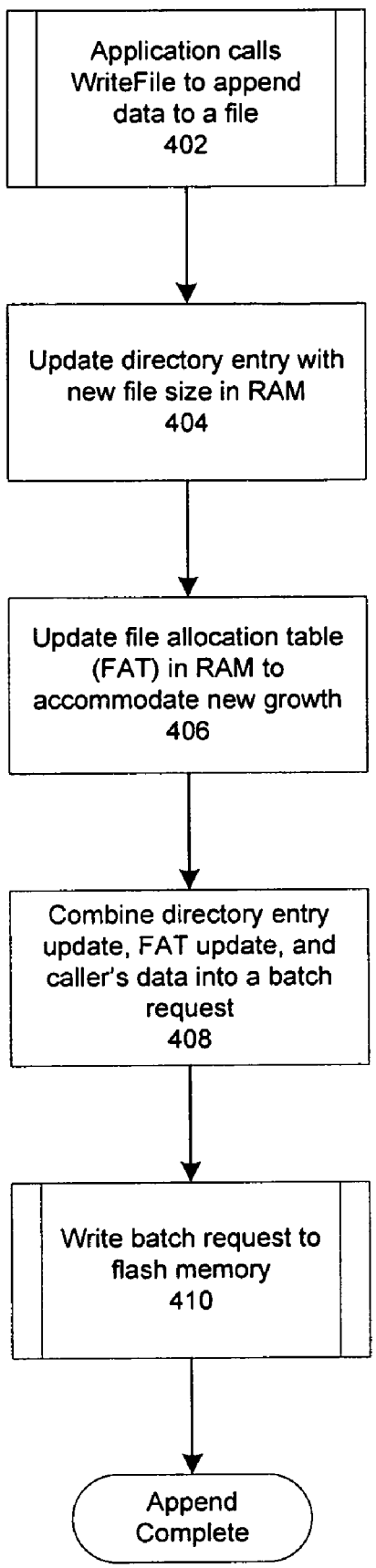
FIG. 4 illustrates an exemplary embodiment of a logic flow.

FIG. 4 illustrates one embodiment of a logic flow 400. Logic flow 400 may be representative of the operations executed by one or more embodiments described herein, such as computing device 100 and/or FMM 112, for example. In one embodiment, for example, logic flow 400 illustrates write operations to flash memory 114. As shown in FIG. 4, an application program may call a write file operation to append data to a file at block 402. A directory entry referring to the file being appended needs to be updated with the new file size at block 404. The cluster chain in the FAT is grown to accommodate the new data at block 406. The directory entry information, FAT update information, and application program data to be written to flash memory 114, may be combined or built into a single batch request at block 408. The batch request may be passed to FMD 220 as an atomic transaction, and the application program data may be written to flash memory 114 at block 410.

In the event of a catastrophic failure such as power-loss or media removal occurred between steps 1 and 2 or 2 and 3 (as indicated in FIG. 3), the disk would be left in an inconsistent state. A typical file system might employ some form of logging or data transacting to allow the operation to be rolled-back or reverted in such a case. By batching all 3 writes into a single atomic transaction request, however, the overhead of logging in the file system is entirely unnecessary because the flash driver guarantees the transaction to either complete entirely or not at all.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a computer-readable storage medium containing instructions that if executed enable a system to receive a write transaction request to write data to a flash memory, assign a sequence number to said write transaction request, and write said data and said sequence number to a set of multiple discontiguous logical sectors corresponding to a set of physical sectors in a spare area of said flash memory in a single atomic operation without allowing for partial writing of said data.

2. The article of claim 1, further comprising instructions that if executed enable the system to receive a request to append data to a file, update a directory entry with a new file size in random access memory, update a file allocation table in said random access memory, and send said write transaction request with said directory entry update information, said file allocation table update information, and said data.

3. The article of claim 1, further comprising instructions that if executed enable the system to maintain a mapping between said logical sectors and said physical sectors in a mapping table.

4. The article of claim 1, further comprising instructions that if executed enable the system to erase data from a set of previous physical sectors corresponding to said logical sectors once said data for said write transaction has been completely written.

5. The article of claim 1, further comprising instructions that if executed enable the system to write a control sector with metadata for said write transaction request.

6. The article of claim 1, further comprising instructions that if executed enable the system to write a control sector with sector information for said write transaction request, said sector information including at least one of transaction information, logical sector mapping information, or a transaction sequence number.

7. The article of claim 1, further comprising instructions that if executed enable the system to update a last known good sector number once said write transaction has been committed, wherein logical sectors, if any, with a same logical sector address and an older sequence number are interpreted as dirty.

8. The article of claim 1, said machine-readable storage medium comprising a computer-readable medium.

9. A method, comprising:
receiving a write transaction request to write data to a flash memory;
assigning a sequence number to said write transaction request; and
writing said data and said sequence number to a set of multiple discontiguous logical sectors corresponding to a set of physical sectors of said flash memory in a single atomic operation, wherein said atomic operation either completely writes said data or writes no data and does not allow for partial writing of said data.

10. The method of claim 9, comprising
receiving a request to append data to a file;
updating a directory entry with a new file size in random access memory;
updating a file allocation table in said random access memory; and
sending said write transaction request with said directory entry update information, said file allocation table update information, and said data.

11. The method of claim 9, comprising maintaining a mapping between said logical sectors and said physical sectors in a mapping table.

12. The method of claim 9, comprising:
writing said data and sequence number to said logical sectors in a spare area of said flash memory; and
erasing data from a set of previous physical sectors corresponding to said logical sectors once said data for said write transaction has been completely written.

13. The method of claim 9, comprising writing a control sector with metadata for said write transaction request.

14. The method of claim 9, comprising writing a control sector with sector information for said write transaction request, said sector information including at least one of transaction information, logical sector mapping information, or a transaction sequence number.

15. The method of claim 9, comprising:
writing said data and said sequence number in a spare area for said flash memory;
committing said write transaction; and
updating a LKG sector number once said write transaction has been committed.

16. An apparatus, comprising:
a processor;
a flash memory coupled to said processor; and
a flash management module that when executed by said processor is arranged to receive a write transaction request to write data to a flash memory, assign a sequence number to said write transaction request, and write said data and said sequence number to a set of multiple discontiguous logical sectors corresponding to a set of physical sectors of said flash memory in a single atomic operation without allowing for partial writing of said data.

17. The apparatus of claim 16, comprising:
a computer-readable media comprising a file system;
the flash management module comprising a flash abstraction layer communicatively coupled to said file system and a flash media driver communicatively coupled to said flash abstraction layer; and
said flash memory communicatively coupled to said flash media driver.

18. The apparatus of claim 17, said file system to receive an append request to append data to a file, and invoke said write transaction request in response to said append request.

19. The apparatus of claim 17, said flash abstraction layer to write said data to said logical sectors in a spare area of said flash memory, and erase data from a set of previous physical sectors corresponding to said logical sectors once said data for said write transaction has been completely written.

20. The apparatus of claim 17, said flash abstraction layer write said data and said sequence number in a spare area for said flash memory, commit said write transaction, and update a LKG sector number once said write transaction has been committed.

* * * * *